United States Patent [19]

Donaghue, Jr. et al.

[11] Patent Number: 4,835,769
[45] Date of Patent: May 30, 1989

[54] PASSIVE BUS COMMUNICATION FOR ISDN

[75] Inventors: Norman J. Donaghue, Jr., Plantation; Jay P. Jayapalan, Hollywood; Rafael E. Salcedo, Miami Springs, all of Fla.

[73] Assignee: Racal Data Communications Inc., Sunrise, Fla.

[21] Appl. No.: 150,130

[22] Filed: Jan. 29, 1988

[51] Int. Cl.[4] .................................................. H04J 3/02
[52] U.S. Cl. ..................................... 370/85; 370/110.1
[58] Field of Search ......................... 370/58, 85, 110.1; 340/825.5

[56] References Cited

U.S. PATENT DOCUMENTS

| | | | |
|---|---|---|---|
| 4,390,944 | 1/1983 | Quackenbush et al. | 364/200 |
| 4,446,515 | 5/1984 | Sauer et al. | 304/200 |
| 4,516,204 | 5/1985 | Sauer et al. | 364/200 |
| 4,532,627 | 7/1985 | Smitt | 370/85 |
| 4,550,402 | 10/1985 | Gable et al. | 370/85 |
| 4,592,045 | 5/1986 | Fundneider | 370/58 |
| 4,592,047 | 5/1986 | Fundneider | 370/58 |
| 4,597,076 | 6/1986 | Bingham et al. | 370/85 |
| 4,688,214 | 8/1987 | DeWitt et al. | 370/94 |
| 4,689,788 | 9/1987 | Wurzburg et al. | 370/110.1 |
| 4,694,952 | 9/1987 | Beckinger et al. | 370/110.1 |
| 4,722,082 | 1/1988 | Furuya et al. | 370/110.1 |

FOREIGN PATENT DOCUMENTS 0151433 1/1985 European Pat. Off.

OTHER PUBLICATIONS

"ISDN Customer to Network Signalling D Channel Protocol Level 1 Aspects", Moore, Whall & Kerswell, 1982 IEEE, pp. 750–756.
"Phase Aligned Passive Bus (PAB) Scheme for ISDN User–Network Interface", Kuwahara, Amemiya & Murano, 1986 IEEE, pp. 1367–1372.
"Report: A Network Interface Chip for ISDN Terminals", Govind Offord & Piper, AT&T Technical Journal, 27–39.
"Considerations on Customer Access to the ISDN", IEEE Trans. on Comm., vol. COM-30, No. 9, Sep. 1982, (Waber), pp. 2131–2136.
"D-Channel Protocol: Role, Requirements, Level 2, Implications", Parodi, Romagnoli & Preti, 1982 IEEE, pp. 757–761.
"Integrated Digital Access Design for ISDN", Patel & Roddick, 1983 IEEE, pp. 1389–1395.

Primary Examiner—Douglas W. Olms
Assistant Examiner—Frank M. Scutch, III
Attorney, Agent, or Firm—Jerry A. Miller

[57] ABSTRACT

An apparatus for providing passive bus communication in an ISDN without use of services of a central office includes a passive bus suitable for ISDN D-channel frame communication, the passive bus having an echo channel and having a plurality of terminal devices coupled to the passive bus. A receiving circuit is coupled to the passive bus for receiving D-channel frames containing a SAPI address transmitted from the terminal devices over the passive bus. A decoding circuit is coupled to the receiving circuit for decoding D-channel addresses transmitted from the terminal devices over the passive bus. The decoding circuit includes a circuit for determining if one of the D-channel frames from the terminal devices include a predetermined SAPI address. A switching circuit is coupled to and responsive to the decoding circuit, and implements a logical communication channel between two or more of the plurality of terminal devices when the D-channel frame includes the predetermined SAPI address. The switching circuit echoes D-channel frames over the echo channel of the passive bus for receipt by the terminal devices (TE) coupled to the passive bus and inhibits transmission of the D-channel frames to the central office when the D-channel frames include the predetermined SAPI address. The TE monitors the D-echo channel to receive the local passive bus communication in addition to contention resolution.

23 Claims, 5 Drawing Sheets

PASSIVE BUS COMMUNICATION FOR ISDN

BACKGROUND

1. Field of the Invention

This invention relates generally to the field of Integrated Services Digital Networks (ISDN) and more particularly to a method and apparatus for implementing communication between devices on a ISDN passive bus without intervention of a central office.

2. Background of the Invention

The evolving ISDN standard proposes use of a passive bus for local connection of a plurality (8) of terminal equipment (TE) devices. These devices are coupled to the ISDN network via a common network terminating device (NT). In the event a D-channel communication path is to be created between devices on the same passive bus, the originating device sends a packet to the central office to set up the call. The central office then sets up a logical channel between the devices to be connected. In this process, the telephone carrier operating the central office becomes involved in the communication process and may therefore charge a fee to the customer for implementing a logical connection between devices on the same passive bus.

The present invention allows TE devices on a common passive bus to avoid such fees by implementing a logical channel independent of the central office. In addition, those skilled in the art will recognize further services that can be provided without intervention of the central office by use of the present invention.

In addition, it is often desirable to provide related and coordinated services between two TE devices such as a personal computer and a telephone. For example, when a sales person receives a telephone call from a client, it would be advantageous for the identity of the caller to be detected by the computer and used to enter a data base which immediately displays customer information to the sales person. Other services dependent upon interaction between TE devices are also advantageously implemented with the present invention.

In European Patent Application No. 151,433, passive bus communication in an ISDN is accomplished by having a network termination unit implement the connections. No particular method or apparatus for implementing passive bus connections is believed to be disclosed in this application.

SUMMARY OF THE INVENTION

It is an object of the present invenion to provide a method and apparatus for communication between TE devices on an ISDN passive bus within the current standards constraints for ISDN.

It is another object of the present invention to provide a method and apparatus for communication between TE devices on an ISDN passive bus without central office intervention.

It is a further object of the present invnetion to provide such passive bus communication in a virtually transparent manner.

These and other objects of the invention will become apparent to those skilled in the art upon consideration of the following description of the invention.

In one embodiment of the present invention an apparatus for providing passive bus communication in an ISDN without use of services of a central office comprises a passive bus suitable for ISDN D-channel communication, the passive bus having a plurality of terminal devices coupled thereto. A bus interface circuit in the NT receives D-channel frames transmitted from the terminal devices over the passive bus. A decoding circuit decodes D-channel addresses transmitted from the terminal devices over the passive bus. The decoding circuit includes means for determining if one of the D-channel frames from the terminal devices include a predetermined SAPI address. A switching circuit is coupled to and responsive to the decoding circuit for implementing a logical communication channel between two or more of the plurality of terminal devices when the D-channel packet includes the predetermined SAPI address.

The apparatus further includes means for implementing an upper layer process independent of the central office in the event the decoding circuit determines that the D-channel frame includes the predetermined SAPI address and means for upper layer process at the central office in the event the decoding means determines that the D-channel frame does not include the predetermined SAPI address.

In another embodiment of the invention, the NT monitors the D-channel addresses and forwards to the central office only those frames which do not include the local SAPI. The TE's then monitor the D-echo channel (sometimes called the E-bit channel) and receive all local data via this D-echo channel.

In another method of providing communication between first and second devices situated on an ISDN passive bus, comprising the steps of transmitting information from the first device over a D-channel frame; at the second device, receiving information from the first device on the D-echo channel; and at the second device, processing the information received over the D-echo channel for a purpose other than contention Another apparatus for local communication over an ISDN passive bus, includes a receiving means for receiving D-echo channel information on the ISDN passive bus. A contention resolution circuit is coupled to the receiving means for resolving contention for use of the passive bus. An upper layer process is responsive to the receiving means and receives the D-echo channel information and performs an upper layer process on the information on the D-echo channel.

Another apparatus for providing communication over an ISDN passive bus, includes first receiving means for receiving a D-channel frame transmitted by a device coupled to the passive bus. An address decoder decodes a SAPI address within the D-channel frame transmitted by the device coupled to the passive bus and compares the SAPI to a predetermined local SAPI. A second receiving means receives a D-channel frame from a central office. A multiplexer combines the D-channel frame from the passive bus with the D-channel frame from the central office when the SAPI equals the local SAPI as determined by the address decoder. A transmitter transmits the multiplexed D-channel frames over the passive bus.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
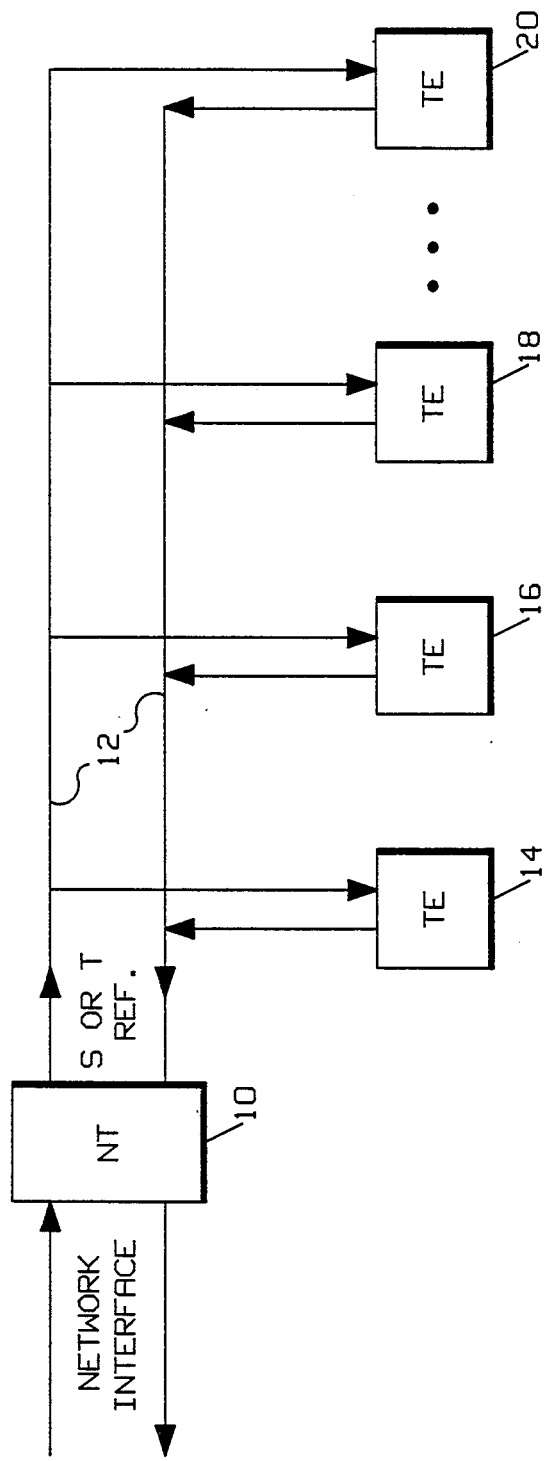
FIG. 1 is a system block diagram showing a network including a passive bus.

Turning now to FIG. 1, the local portion of an ISDN is shown including a network termination device (NT) 10 which has the ISDN network interface at one side, U reference point, which is ultimately connected to a central office providing access to the ISDN. At the other side is a S/T reference point. This S/T reference point forms the passive bus 12. A plurality of terminal equipment devices (TE) 14, 16 18 through 20 are connected to the passive bus in parallel as shown.

Local passive bus communication links may be established using the present invention by either of two distinct techniques, both of which will be described herein and will be referred to as versions 1 and 2 for ease of reference. In version 1, the NT echos all D-channel activity over the D-echo channel on the passive bus and the TE devices are adapted to monitor this D-echo channel (normally used only for contention resolution). A special address is used for such communication and when this address is detected at the NT, the D-channel frame is inhibited from passing to the central office. In the other distinct embodiment (version 2), the D-channel itself is used to facilitate the passive bus communication by having the NT retransmit or loop back D-channel frames having the local address over the passive bus for receipt by the TE for which the information is destined. When D-channel frame contains this special local address, the NT once again inhibits passing this frame along to the central office. Those skilled in the art will recognize the various design tradeoffs associated with each version.

In version 1, the TE's communicate by receiving data on the D-echo channel and by transmitting via normal D channel methods with the local SAPI indicative of a local (local to the passive bus) communication link. In version 2, the TE's on the passive bus communicate with each other using D channel frames containing a local SAPI in addition to the information from the CO.

The SAPI (Service Access Point Identifier) of LAPD in an ISDN identifies a point at which data link layer services are provided by a data link layer entity to a layer 3 or management entity. Consequently, the SAPI specifies a data link layer entity that should process a data link layer frame and also a layer 3 or management entity which is to receive information carried by the data link layer frame. The standard SAPI allows 64 service access points to be specified. Only a few of those SAPI addresses have been reserved in the standards at this point in time. In the present invention, a particular SAPI is designated for use in local communication.

Figure 2:
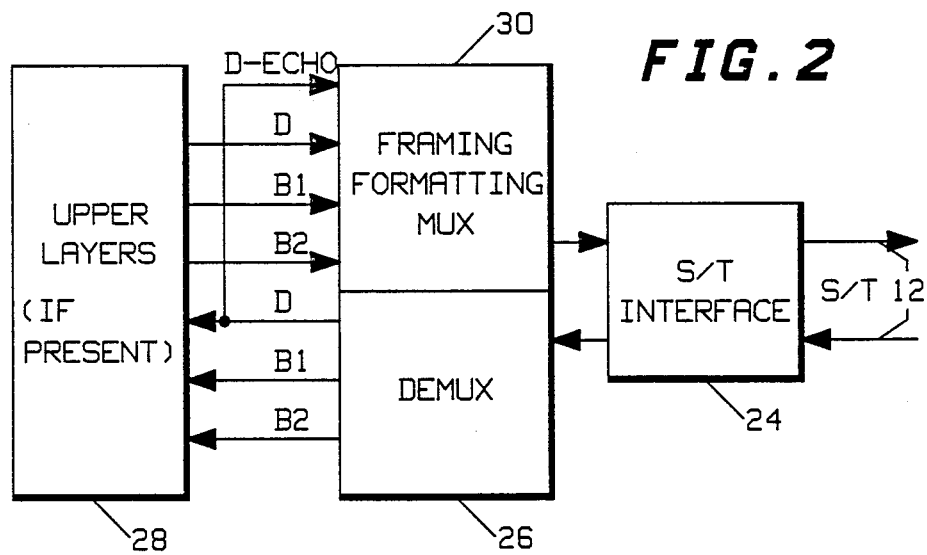
FIG. 2 shows a functional block diagram of the layer 1 functions of the present invention.

Turning to FIG. 2, a functional block diagram of the ISDN layer 1 functions of one embodiment of the NT 10 is shown. This block diagram shows an NT containing upper layer processes if present, but this is not limiting as the NT may be an NT1 type without upper layer processing. The device of FIG. 2, is applicable to both version 1 and version 2. The passive bus 12 is coupled to an S/T interface 24 which may clean up the signals from the passive bus and convert the bus signals to standard logic levels such as TTL logic levels. In the other direction, the S/T interface 24 converts the standard logic levels to appropriate bus signals. Other standard interface functions may also be performed by the S/T interface 24. The signals received from the bus are passed to a demultiplexer (demux) which separates the standard 2B+D bus signals to the individual B1, B2 and D channel signals as well as the echo channel signal which are then passed to upper layers 28 for further processing if the NT provides NT2 type functions. The D-channel is also provided back to a multiplexer 30, which also performs framing, formatting and other related functions, for retransmission back over the D-echo channel of the passive bus. This echo channel is a standard function provided by the NT in the current standards.

At the physical layer, the NT echos all bits from the D-channel on the D-echo channel of the physical levels frames. This does not necessarily involve any decoding of information and is normally only a contention resolution scheme. This fundamental function is not altered by the present invention but in version 1 is used to effect local communication by having the TE devices monitor this D-echo channel to receive local communication.

In the opposite direction, the B1, B2 and D channels are passed from the upper layers to the mux 30 for formatting into standard frames which are then passed through S/T interface 24 to the passive bus 12.

Figure 3:
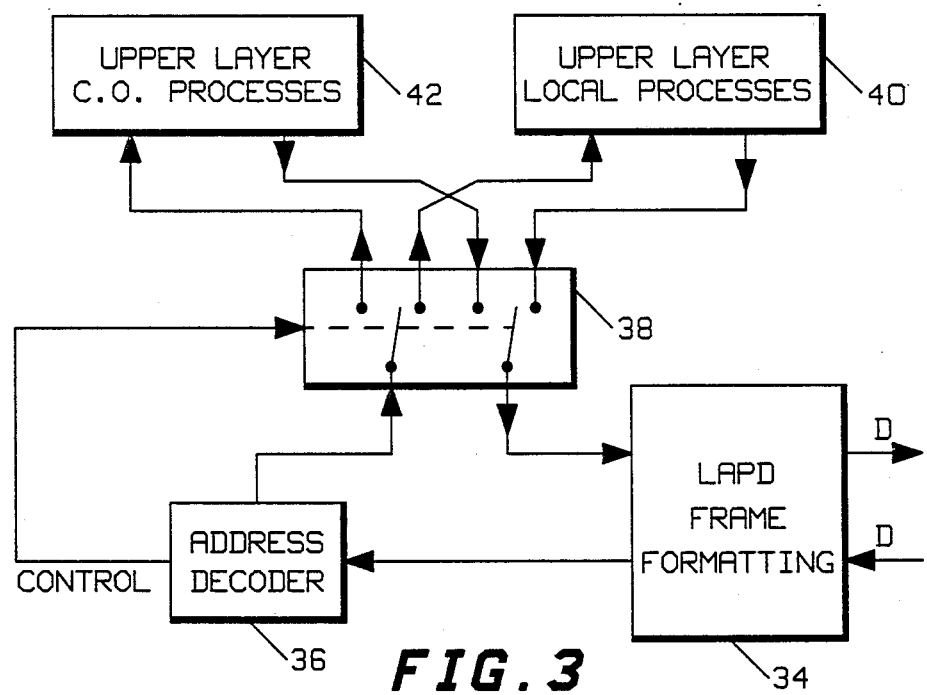
FIG. 3 shows a functional block diagram of a portion of the D-channel layer 2 functions of the present invention.

Turning now to FIG. 3, a functional block diagram of a portion of the Layer 2 process of both versions of the present invention is shown wherein D-channel frames from Layer 1 are received by LAPD frame formatter 34 which receives the frames and separates the fields prior to sending the LAPD packet to an address decoder 36. This address decoder 36 inspects the service access point identifier (SAPI) address of the D-channel packet to determine whether or not it matches a stored address which is indicative that a local connection is to be implemented (referred to herein as LSAPI for Local SAPI). Of course, in version 1, the D-frame will have already been echoed back over the passive bus at layer 1 as shown in FIG. 2. In version 2, the upper layer process includes a loop back mechanism to allow retransmission of the D-channel frame over the outgoing D-channel for receipt by the designated TE.

If the address decoder 36 determines that a match between the LAPD SAPI and the LSAPI is present, a switch 38, operating under the control of decoder 36, routes the packet to a local upper layer process 40 for producing a local connection. This may be a null process in the event the NT does not get involved in any other processing functions in the implementation at hand such as version 1. Or, the NT may also perform other advanced NT2 type functions such as statistics gathering, diagnostic control, local connections to other local (or remote) NT's in order to further bypass central office intervention, etc. All devices on the passive bus may communicate with each using the same techniques including the NT. This invention allows TE to TE as well as TE to NT communications. For version 1, the D-echo channel is used by the TE to receive the frame of information. For version 2, the received D-channel frame containing the LSAPI is statisically combined with frames from the C and transmitted over the passive bus for receipt by the TE's.

The frame is echoed over the echo channel back out over the passive bus 12 in version 1 (or retransmits the frame over the D-channel in version 2) so that it is accessed by the TE for which it is intended. The switch 38 further serves to inhibit transmission of the D-channel packet to the central office upper layer CO processes 42 (located in the CO). When LSAPI is not encountered in the D-channel frame, switch 38 sends the D-channel frame to the central office and thereby couples the D-channel to the upper layer CO processes 42 and diverts it from the upper layer local processes 40.

In essence, the link level of the NT reads the SAPI values received and decides on the entity in the upper layer to which the requested service is provided. In the present invention, the NT determines that this service is available locally. Thus, the NT selects a local service access point which implements services which are only of local significance which do not require services of a central office or switch. This allows the local passive bus to carry out local functions independent of the central office or switch.

Figure 4:
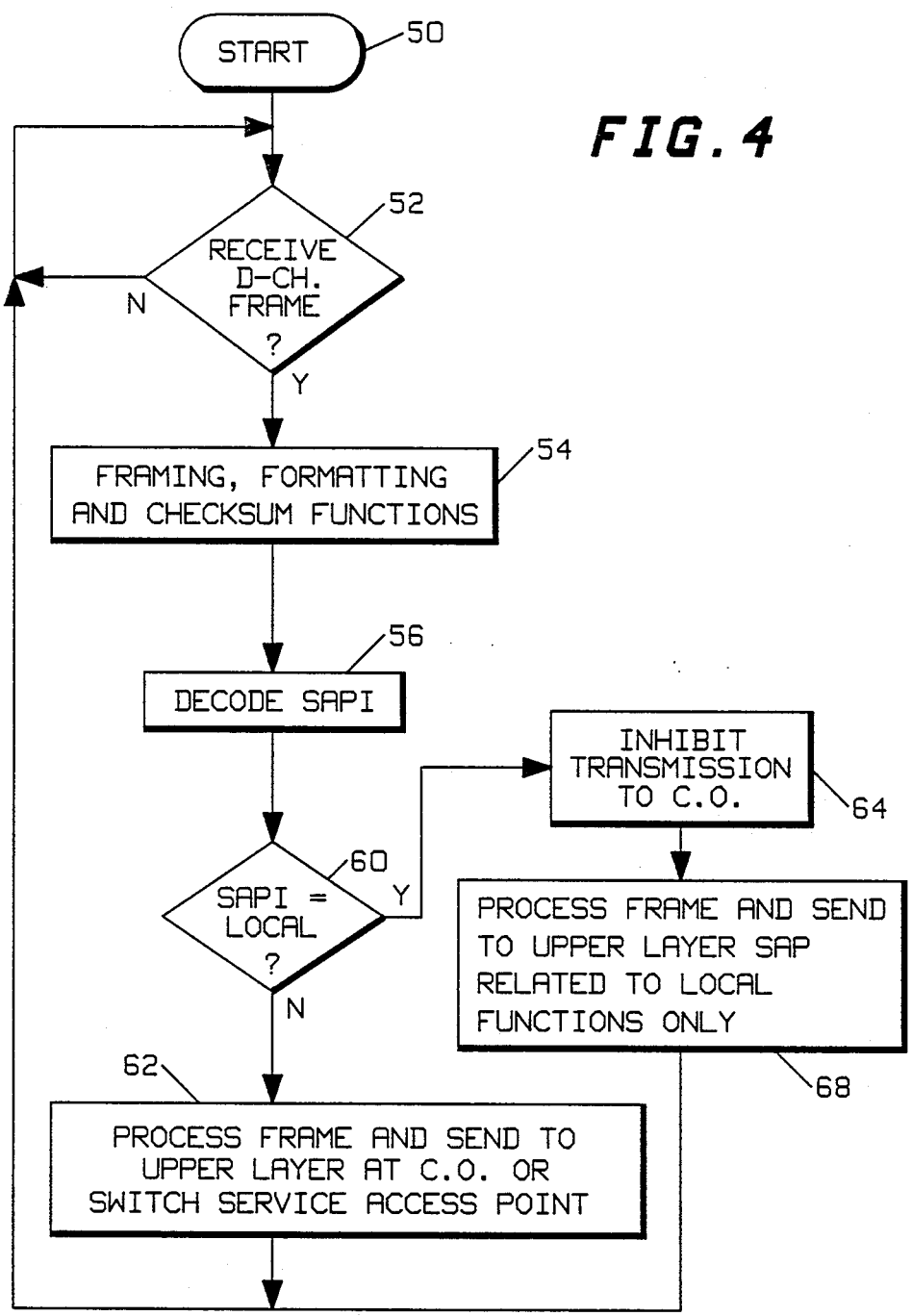
FIG. 4 shows a flow chart of the operation of the NT 10 of the present invention.

Turning now to FIG. 4, a flow chart of the broad operation of the present invention according to either version 1 or version 2 begins at start block 50 after which block 52 checks to see if a D-channel frame has been received. If not, it awaits receipt of the next D-channel frame. If so, framing formatting and checksum functions are performed at 54. Then, at 56 the SAPI is decoded and compared with SAPI's indicative of local functions at 60. If there is no match, control passes to 62 where the frame is processed normally and forwarded to the upper layers at the central office or to local layers that interface with the central office or switch. At this point control passes back to 52. If a match occurs at 60, control passes to 64 where transmission of the frame to the central office is inhibited. The frame is then passed to 68 where the frame is sent to a local upper layer service access point which performs local functions if such processes are present and utilized in the NT. Control then passes back to 52.

Figure 5:
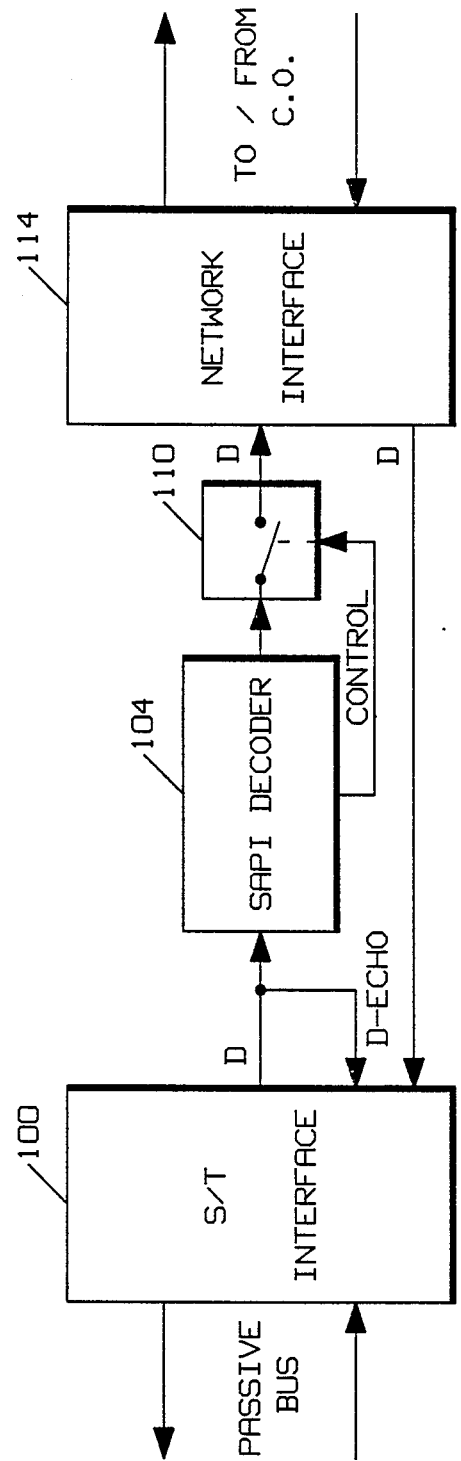
FIG. 5 shows a block diagram of a simple embodiment of an NT utilizing D-echo channel communication.

Turning now to FIG. 5, an embodiment of version 1 of the present invention is shown which uses only D-echo channel communication. This embodiment shows an NT which provides only the NT1 type functions plus the simplest embodiment of the present invention. This is not limiting however, since the present feature may also be provided in NT2 devices having numerous other features. In this embodiment, an S/T interface receives D-channel frames from the passive bus and echos the frames over the D-echo channel. The D-channel frame is passed on to SAPI decoder 104 which operates similar to decoder 36 by comparing the SAPI with a stored LSAPI. In the event of a match, the control line of SAPI decoder 104 opens a normally closed switched 110 so that the D-channel frame is not passed on to the central office via network interface 114.

The SAPI decoders of the present invention may be either implemented using a programemd process or by using standard hardware. For example, the SAPI may be passed through a shift register with each bit being compared to a stored LSAPI (when the SAPI is fully occupying the shift register) in comparators or any array of AND gates. Other schemes will occur to those skilled in the art.

Figure 6:
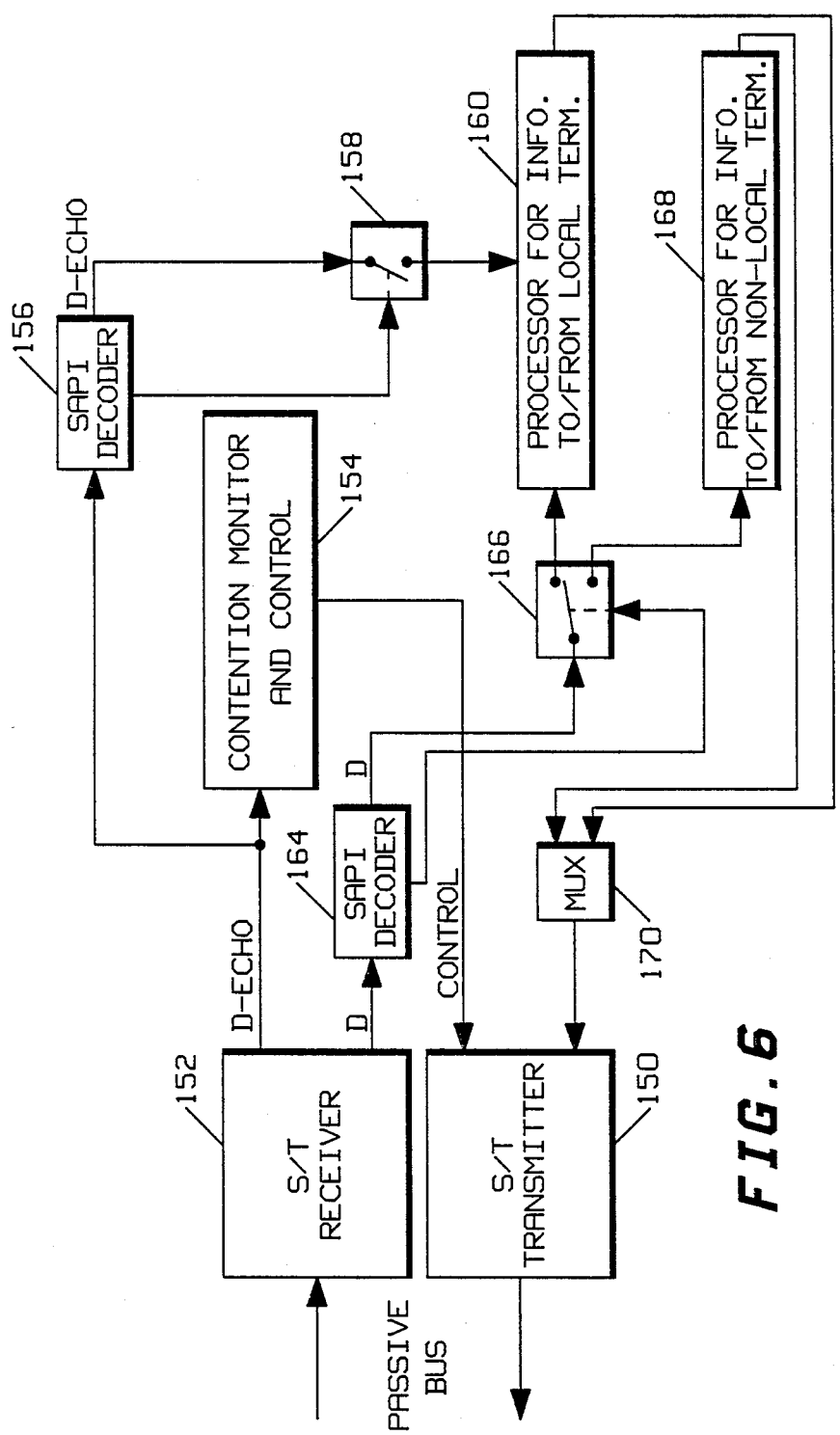
FIG. 6 shows a block diagram of a TE incorporating provisions for the present invention.

Turning now to FIG. 6, a TE capable of implementing both versions of the present invention simultaneously is shown is shown in block diagram form. An S/T interface circuit is shown broken down into an S/T transmitter 150 and an S/T receiver 152. The D-echo channel is received by the S/T receiver 152 and passed to a contention monitor and control circuit 154 and to a SAPI decoder 156. The contention monitor and control circuit 154 operates in a conventional fashion to resolve contention for the passive bus. The SAPI decoder 156 decodes the SAPI and passes the D-echo signal to a switch 158 which is opened or closed under the control of the SAPI decoder 156 to either pass or inhibit from passing the D-echo channel to a processor 160 for information to/from a local terminal depending upon whether or not (respectively) the SAPI is local.

The D-channel from the S/T receiver 152 is passed to a SAPI decoder 164, the output of which is passed to a switch 166 operating under the control of the SAPI decoder 164. Switch 166 passes the D-channel to the local processor 160 in the event the SAPI is local or to a processor for information to/from a non-local terminal 168 otherwise. The outputs of processors 160 and 168 are multiplexed by a multiplexer 170 and placed back on the passive bus via S/T transmitter 150. The multiplexer 17 may be a statistical multiplexer so that the local and remote D-channel frames are combined to form the final D-channel transmitted.

The implementation of FIG. 6 presumes that local information may be received by the terminal via either the D-echo channel or D-channel. Those skilled in the art will recognize that the circuit may be readily modified to allow for use of one or the other form of communication. In the case of the exclusive use of the D-echo channel for local passive bus communication (version 1) the use of SAPI decoder 164 and switch 166 is unnecessary. In version 1 the TE devices receive local information on the D-echo channel. In version 2 the TE devices receive local information on the D-channel.

The present invention may be implemented in any of a number of suitable ways using dedicated ISDN integrated circuits, specially designed hardware or may be largely implemented by use of a programmed microcomputer or any combination of the above without deviating from the present invention.

Those skilled in the art will appreciate that, in other embodiments, the present invention could also be implemented as a separate device situated between the NT 10 and the TE's 14 through 20. Such an alternative embodiment would duplicate a substantial amount of the NT 10's functionality but may be useful in some instances.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. An apparatus for providing communication among devices connected to a passive bus in an Integrated Services Digital Network (ISDN) without use of services of a central office, the apparatus comprising in combination:

a passive bus suitable for ISDN D-channel communication, said passive bus having a plurality of terminal devices coupled thereto;

receiving means, coupled to said passive bus, for receiving D-channel frames transmitted from said terminal devices over said passive bus;

decoding means, coupled to said receiving means, for decoding D-channel Service Access Point Identifier (SAPI) addresses transmitted from said terminal devices over said passive bus, said decoding means including means for determining if one of said D-channel frames from said terminal devices include a predetermined SAPI address; and connecting means coupled to and responsive to said decoding means, for implementing a logical communication channel between two or more of said plurality of terminal devices when said D-channel frame includes said predetermined SAPI address.

2. The apparatus of claim 1, further comprising means for implementing an upper layer process independent of said central office to the event said decoding means determines that said D-channel frame includes said predetermined SAPI address.

3. The apparatus of claim 2, further comprising means for implementing a central office upper layer process in the event said decoding emans determines that said D-channel frame does not include said predetermined SAPI address.

4. The apapratus of claim 1, wherein said passive bus includes an echo channel, and wherein said connecting means includes means for echoing D-channel frames over said echo channel of said passive bus for receipt by said terminal devices coupled to said passive bus and for inhibiting transmission of said D-channel frames to said central office when said D-channel frames include said predetermined SAPI address.

5. The apparatus of claim 1, wherein said connecting means includes means for retransmitting D-channel frames over the passive bus D-channel when said D-channel frames include said predetermined SAPI address and for inhibiting transmission of said local D-channel frames to said central office when said local D-channel frames include said predetermined SAPI address.

6. The apparatus of claim 1, further including means for inhibiting transmission of D-channel frames to said central office in the event said frames include said predetermined SAPI address.

7. The apparatus of claim 2, wherein said local upper layer process includes establishing a communication link between two devices situated on said passive bus.

8. An apparatus for providing passive bus communication in an ISDN (Integrated Services Digital Network) without use of services of a central office, the apparatus comprising in combination:

a passive bus suitable for ISDN D-channel frame communication, said passive bus having an echo channel and having a plurality of terminal devices coupled to said passive bus;

receiving means, coupled to said passive bus, for receiving D-channel frames containing a SAPI (Service Access Point Identifier) address transmitted from said terminal devices over said passive bus;

decoding means, coupled to said receiving means, for decoding D-channel addresses transmitted from said terminal devices over said passive bus, said decoding means including means for determining if one of said D-channel frames from said terminal devices include a predetermined SAPI address; and switching means coupled to and responsive to said decoding means, for implementing a logical communication channel between two or more of said plurality of terminal devices, said switching means including means for transmitting D-channel frames over said echo channel of said passive bus and for inhibiting transmission of said D-channel frames to said central office when said D-channel frames include said predetermined SAPI address.

9. A method for providing communication between a plurality of terminal devices over a passive bus in an ISDN (Integrated Services Digital Netwwrk) without use of services of a central office, the method comprising in combination:

receiving D-channel frames containing SAPI (Service Access Point Identifier) addresses transmitted from said terminal devices over said passive bus;

decoding D-channel SAPI addresses transmitted from said terminal devices over said passive bus and determining if one of said D-channel frames from said terminal devices include a predetermined SAPI address; and implementing a logical communication channel between two or more of said plurality of terminal devices when said D-channel frame includes said predetermined SAPI address.

10. The method of claim 9, further comprising the step of implementing an upper layer process independent of said central office in the event it is determined that said D-channel frame includes said predetermined SAPI address.

11. The method of claim 10, further comprising the step of implementing an upper level process which interfaces with said central office in the event it is determined that said D-channel frame does not include said predetermined SAPI address.

12. The method of claim 9, wherein said implementing step includes echoing D-channel frames over an echo channel of said passive bus; and inhibiting transmission of said D-channel frames to said central office when said D-channel frames include said predetermined SAPI address.

13. The method of claim 9, further including the step of inhibiting transmission of D-channel frames to said central office in the event said frames include said predetermined SAPI address.

14. A method of providing local functions in an ISDN (Integrated Services Digital Network), the method comprising the steps of:

receiving a D-channel frame including a SAPI (Service access Point Identifier);

decoding said SAPI;

determining if said SAPI corresponds to a process involving only local-devices;

routing said D-channel frame to a local service access point in the event said SAPI corresponds to a local process involving only local devices and routing said D-channel frame to a remote service access point otherwise.

15. The method of claim 14, wherein said local process includes establishing a communication channel between two terminal devices coupled to a passive bus.

16. The method of providing communication between first and second devices situated on an ISDN Integated Services Digital Network) passive bus, comprising the steps of:
- transmitting information from said first device over a D-channel frame;
- at said second device, receiving information from said first device on said D-echo channel; and
- at said second device, processing said information received over said D-echo channel for a purpose other than contention resolution.

17. The method of claim 16, wherein said processing step includes processing said information for the purpose of passive bus communication between said first device and said second device.

18. The method of claim 16, further comprising the step of comparing an ISDN SAPI (Service Access Point Identifier) within said D-channel frame with a predetermined local SAPI.

19. An apparatus for local communication over an ISDN (Integrated Service Digital Network) passive bus, comprising:
- receiving means for receiving D-echo channel information on said ISDN passive bus;
- contention resolution means coupled to said receiving means for resolving contention for use of said passive bus; and
- upper layer processing means, coupled to said receiving means and receiving said D-echo channel information, for performing an upper layer process on the information on said D-echo channel.

20. The apparatus of claim 19, further comprising means for detecting a SAPI forming a part of said D-echo channel information.

21. The apparatus of claim 20, further comprising means for comparing said SAPI (Service Access Point Identifier) with a predetermined SAPI.

22. An apparatus for providing communication over an ISDN (Integrated Services Digital Network) passive bus, comprising in combination:
- first receiving means for receiving a D-channel frame transmitted by a device coupled to said passive bus;
- address decoding means for decoding a SAPI (Service Access Point Identifier) address within said D-channel frame transmitted by said device coupled to said passive bus and comparing said SAPI to a predetermined local SAPI;
- second receiving means for receiving a D-channel frame from a central office;
- multiplexing means for combining said D-channel frame from said passive bus with said D-channel frame from said central office when said SAPI equals said local SAPI as determined by said address decoding means; and
- transmitting means for transmitting said multiplexed D-channel frames over said passive bus.

23. The apparatus of claim 22, wherein said multiplexing means comprising a statistical multiplexer.

* * * * *